United States Patent
Sugawara et al.

(10) Patent No.: US 9,681,037 B2
(45) Date of Patent: Jun. 13, 2017

(54) IMAGING APPARATUS AND ITS CONTROL METHOD AND PROGRAM

(71) Applicant: CANON KABUSHIKI KAISHA, Tokyo (JP)

(72) Inventors: Atsushi Sugawara, Yokohama (JP); Yuichi Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/249,452

(22) Filed: Apr. 10, 2014

(65) Prior Publication Data

US 2014/0313373 A1    Oct. 23, 2014

(30) Foreign Application Priority Data

Apr. 19, 2013   (JP) ................................. 2013-088728

(51) Int. Cl.
*H04N 5/232*   (2006.01)
*H04N 5/225*   (2006.01)
(Continued)

(52) U.S. Cl.
CPC ......... *H04N 5/23212* (2013.01); *G06T 5/003* (2013.01); *G06T 5/50* (2013.01);
(Continued)

(58) Field of Classification Search
CPC ............. H04N 5/23212; H04N 5/2254; H04N 5/23229; G06T 5/003; G06T 5/50;
(Continued)

(56) References Cited

U.S. PATENT DOCUMENTS 8,194,995 B2 *   6/2012   Wong et al. ............... 382/255
8,289,440 B2 *  10/2012   Knight ............... H04N 5/23212
                                                              348/222.1
(Continued)

FOREIGN PATENT DOCUMENTS

| CN | 101713902 A | 5/2010 |
| JP | 2001-021794 A | 1/2001 |
| JP | 2011-133714 A | 7/2011 |

OTHER PUBLICATIONS

Ng, Ren, et al., "Light Field Photography with a Hand-held Plenoptic Camera," Stanford Tech Report CTSR Feb. 2005.
(Continued)

*Primary Examiner* — Padma Haliyur
(74) *Attorney, Agent, or Firm* — Fitzpatrick, Cella, Harper & Scinto (57) ABSTRACT

An imaging apparatus includes an imaging unit for picking up an optical image of an object and generating image pickup data which can be refocused, a detection unit for detecting a focus state of the optical image of the object, a prediction unit for predicting an in-focus position of the optical image of the object on the basis of a detection result of the detection unit, and a focus adjustment unit for driving a focus lens on the basis of the in-focus position predicted by the prediction unit, wherein in a case where the imaging unit picks up a plurality of images from the object, the focus adjustment unit drives the focus lens to a position deviated from the in-focus position predicted by the prediction unit by a predetermined amount, and has a plurality of patterns of a position deviated by the predetermined amount.

14 Claims, 8 Drawing Sheets

(51) Int. Cl.
*G06T 5/00* (2006.01)
*G06T 5/50* (2006.01)

(52) U.S. Cl.
CPC ....... *H04N 5/2254* (2013.01); *H04N 5/23229* (2013.01); *G06T 2200/21* (2013.01); *G06T 2207/10016* (2013.01); *G06T 2207/10052* (2013.01)

(58) Field of Classification Search
CPC ....... G06T 2207/10016; G06T 2200/21; G06T 2207/10052
See application file for complete search history.

(56) References Cited

U.S. PATENT DOCUMENTS

| | | | |
|---|---|---|---|
| 8,542,291 B2 | 9/2013 | Ohnishi | |
| 2008/0277566 A1* | 11/2008 | Utagawa | G02B 7/34 250/208.1 |
| 2009/0059023 A1* | 3/2009 | Sasaki | 348/222.1 |
| 2013/0222633 A1* | 8/2013 | Knight | H04N 5/23293 348/222.1 |

OTHER PUBLICATIONS

Office Action dated Nov. 30, 2016, in Chinese Patent Application No. 201410155190.4.

* cited by examiner

FIG. 5A $$A = \sum_{a=1}^{6}\sum_{b=1}^{3}(pab)$$

$$B = \sum_{a=1}^{6}\sum_{b=4}^{6}(pab)$$

IMAGING APPARATUS AND ITS CONTROL METHOD AND PROGRAM

BACKGROUND OF THE INVENTION

Field of the Invention

The present invention relates to an imaging apparatus represented by a digital camera and, more particularly, to an imaging apparatus having a refocus function and a continuous photographing function.

Description of the Related Art

In the related arts, among a digital camera and the like, there is an apparatus which can perform a continuous photographing. If a phase difference detection method used in, for example, a single lens reflex camera or the like is performed as an auto focus (hereinbelow, referred to as AF) during the continuous photographing, an arithmetic operation of the AF can be performed at a relatively high speed and an image in which each frame thereof is AF-controlled can be picked up. However, since there is a time lag between an accumulation operation of an AF sensor and an exposure of an imaging element, particularly, with respect to an object which moves at a high speed, even if the AF control is performed on the basis of an output accumulated in the AF sensor, the object moves during the time lag that the image pickup has. Thus, such a phenomenon that the image is defocused at the time of the image pickup can occur. Therefore, in the Official Gazette of Japanese Patent Application Laid-Open No. 2001-21794 (Patent Literature 1), such a technique that a focus position at the time of exposure of the imaging element is predicted from a plurality of past AF results, the focus position is corrected by an amount corresponding to the considered time lag, and a focus lens is moved is proposed.

An imaging apparatus having such a construction that a microlens array is arranged on a front surface of an imaging element at a rate in which one microlens is provided for a plurality of pixels, thereby enabling information of an incidence direction of a ray of light which enters the imaging element (also known as "light field data") to be also obtained is proposed in Ren Ng, et al., "Light Field Photography with a Hand-Held Plenoptic Camera", Stanford Tech Report CTSR 2005-02 (Non-Patent Literature 1) or the like. As a use of such an imaging apparatus, besides a use in which an ordinary photographed image is generated on the basis of an output signal from each pixel, such a use that by executing a predetermined image processing to a photographed image, an image focused to an arbitrary focal distance can be reconstructed or the like can be also considered.

However, the related art disclosed in Patent Literature 1 has such a problem that, for example, like a fall accident scene which occurs in the photographing of a motorcycle race scene or the like, in the case of an object which changes suddenly a speed of motion thereof or the like, it is difficult to predict a focus position and it is difficult to execute the accurate AF operation. Further, since the AF control is made to a target object, for example, if an attention is paid to one object which is running in a race scene, it is fundamentally impossible to photograph an image focused to another object which is running after the target object.

Also in the technique disclosed in Non-Patent Literature 1, a focal distance at which an image can be reconstructed is limited by a construction of an imaging apparatus and, generally, an image focused to all object distances in a range from the nearest side to the infinite side cannot be always reconstructed.

It is, therefore, an aspect of the invention to provide an imaging apparatus which can obtain a desirably-focused image even at the time of a continuous photographing of an object which changes suddenly a speed of motion thereof.

SUMMARY OF THE INVENTION

To accomplish the above aspect, according to the invention, an imaging apparatus comprises: an imaging unit configured to pick up an optical image of an object and generate image pickup data which can be refocused, a detection unit configured to detect a focus state of the optical image of the object; a prediction unit configured to predict an in-focus position of the optical image of the object on the basis of a result of the detection of the detection unit; and a focus adjustment unit configured to drive a focus lens on the basis of the in-focus position predicted by the prediction unit, wherein in a case where the imaging unit picks up a plurality of images from the object, the focus adjustment unit drives the focus lens to a position deviated from the in-focus position predicted by the prediction unit by a predetermined amount and has a plurality of patterns of a position deviated by the predetermined amount.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

Figure 1:
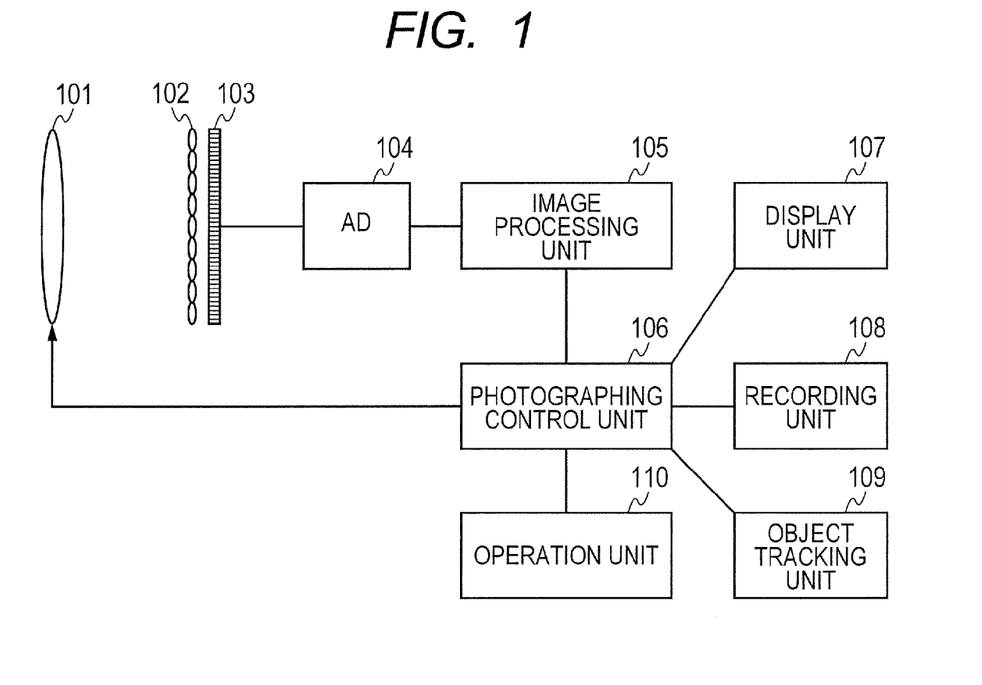
FIG. 1 is a whole block diagram of an imaging apparatus according to an embodiment of the invention.

FIG. 2 is a block diagram of a camera according to an embodiment of the invention. In the diagram, a photographing lens 101 is an optical system constructed by a plurality of lenses although not shown, and forms an optical image of an object. A movable focus lens is included in the plurality of lenses. By moving the focus lens, a focus state of the object can be adjusted. A microlens array (hereinbelow, referred to as MLA) 102 is constructed by a plurality of microlenses and is arranged near a focus position of the photographing lens 101. A ray of light which passes through different pupil areas of the photographing lens 101 enters the MLA 102 and is separated by every pupil area and exits. An imaging element 103 picks up an optical image of the object, is constructed by a CCD, a CMOS image sensor, or the like, and is arranged near the focus position of the MLA 102. The MLA 102 and the imaging element 103 will be described in detail hereinafter. An AD converter 104 converts an analog image signal which is output from the imaging element 103 into digital data. An image processing unit 105 executes a predetermined image processing or the like to the digital data, thereby obtaining digital image data of the object. A photographing control unit 106 controls in such a manner that the digital image data obtained by the image processing unit 105 is displayed onto a display unit 107 constructed by a liquid crystal display or the like and is stored into a recording unit 108, or the like. Further, an object tracking unit 109 receives the digital image data from the photographing control unit 106 and searches for a position in a picture image of a specific object existing in the image. The operation of the object tracking unit will be described in detail hereinafter. The photographing control unit 106 controls each unit in such a manner that a CPU loads and executes a program stored in a memory (not shown). In this case, all or a part of functions of the respective units may be executed by the CPU or may be constructed by hardware.

An operation unit 110 is a portion such as button, touch panel, or the like for receiving the operation from the user. The operation unit 110 executes various kinds of operations such as start of the focusing operation, deletion of the digital image data stored in the recording unit 108, and the like in accordance with the received operation. The photographing lens 101 is electrically and mechanically connected to the photographing control unit 106. Information of the photographing lens can be obtained by communication. At the time of the focusing operation, a drive command or the like of a focus lens can be transmitted.

Subsequently, a construction of the photographing lens 101, MLA 102, and imaging element 103 in the imaging apparatus according to the embodiment will be described.

Figure 2:
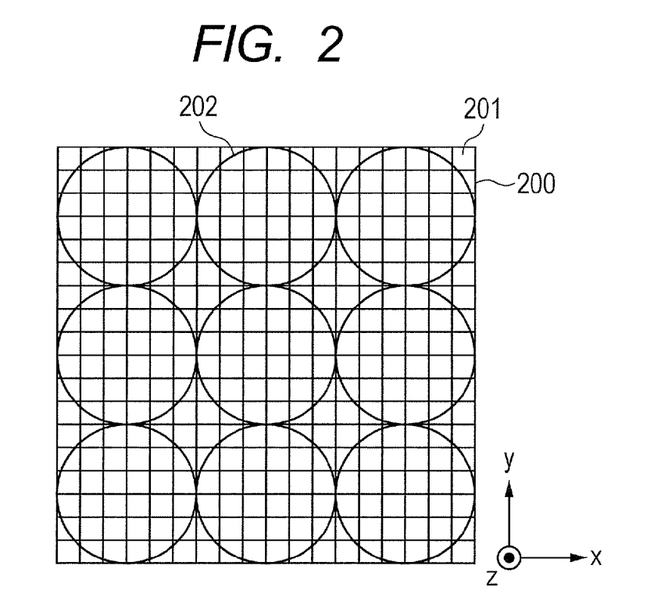
FIG. 2 is a diagram illustrating a construction of an imaging element and a microlens array in the imaging apparatus according to the embodiment of the invention.

FIG. 2 is a diagram for describing a construction of the imaging element 103 and the MLA 102. FIG. 2 shows the imaging element 103 and the MLA 102 when viewing from the direction of a z axis which correspond to an optical axis from the photographing lens. The microlenses are arranged in such a manner that one microlens 202 corresponds to a plurality of unit pixels 201 constructing a virtual pixel 200 of the photographed image. The microlens 202 is one of the microlenses constructing the MLA 102. The embodiment is illustrated on the assumption that there are 36 (6 rows×6 columns) unit pixels 201 in total correspondingly to one microlens. As for coordinate axes shown in the diagram, the optical axis is shown by the z axis, and an x axis (horizontal direction) and a y axis (vertical direction) are defined in an image pickup plane which is parallel with a plane perpendicular to the z axis. FIG. 2 illustrates a part of a photosensitive surface of the imaging element 103 and a very large number of pixels are arranged in an actual imaging element.

Figure 3:
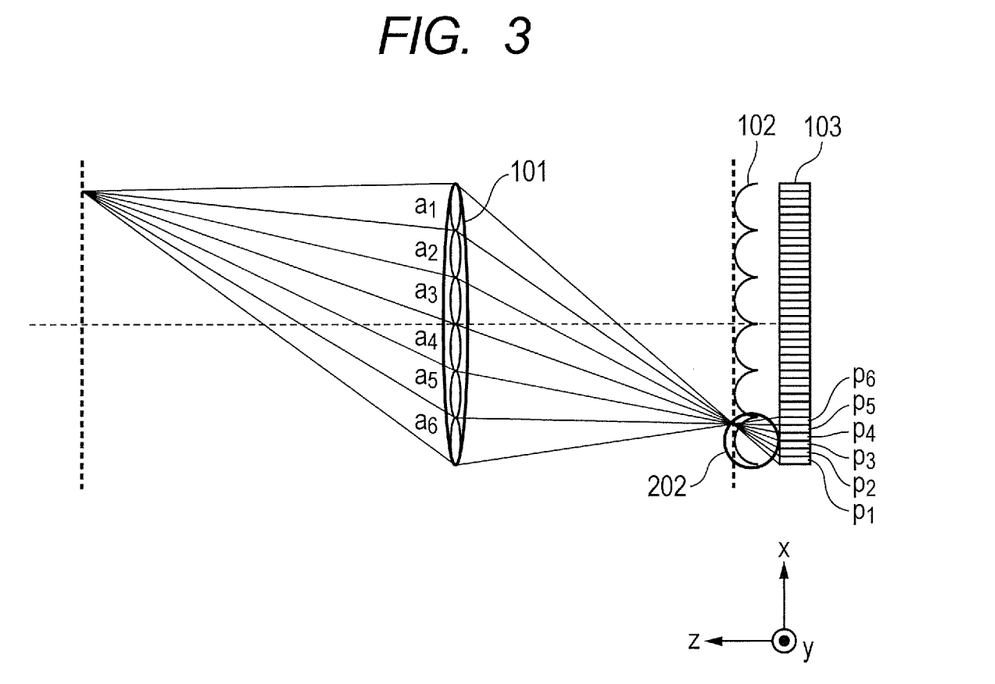
FIG. 3 is a diagram illustrating a construction of a photographing lens, the microlens array, and the imaging element in the imaging apparatus according to the embodiment of the invention.

FIG. 3 illustrates a state where the light exiting from the photographing lens 101 passes through the one microlens 202 and is received by the imaging element 103, and this diagram shows the state when viewing from the direction perpendicular to the optical axis (z axis). The rays of light which exit from pupil areas $a_1$ to $a_6$ of the photographing lens 101 and pass through the microlens 202 are focused onto corresponding unit pixels $p_1$ to $p_6$ of the imaging element 103 arranged behind the microlens 202, respectively.

Figure 4A:
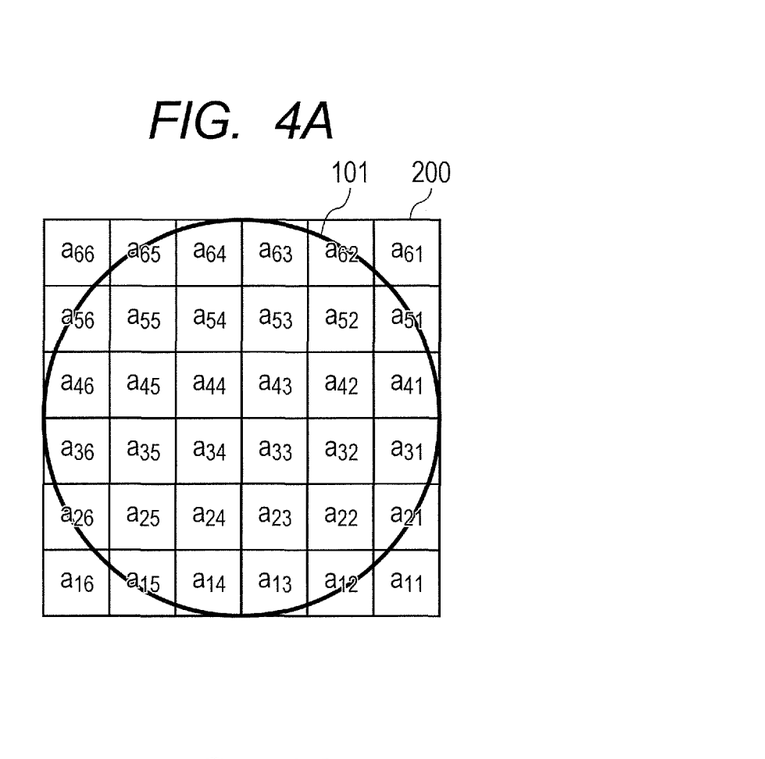
FIGS. 4A and 4B are diagrams illustrating a correspondence relation between a pupil area of the photographing lens and a photosensitive pixel in the imaging apparatus according to the embodiment of the invention.
Figure 4B:
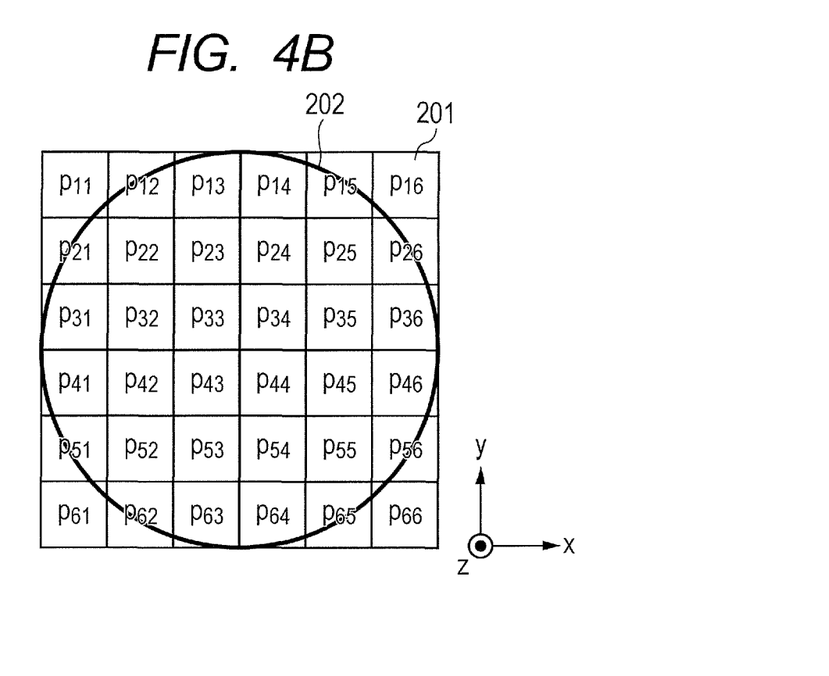

FIG. 4A is a diagram of an aperture of the photographing lens 101 when viewing from the optical axis (z) direction. FIG. 4B is a diagram of the one microlens 202 and the pixels 201 arranged behind the microlens 202 and this diagram shows a state when viewing from the optical axis (z) direction. In the case where the pupil area of the photographing lens 101 is divided into areas of the same number as the number of pixels existing under the one microlens as illustrated in FIG. 4A, the ray of light from one pupil division area of the photographing lens 101 is focused in one pixel. However, it is now assumed that an F number of the photographing lens and that of the microlens almost coincide. Now, assuming that pupil division areas of the photographing lens illustrated in FIG. 4A are $a_{11}$ to $a_{66}$ and pixels illustrated in FIG. 4B are $p_{11}$ to $p_{66}$, a correspondence relation between them is a point symmetry when viewing from the optical axis (z) direction. Therefore, a ray of light exiting from the pupil division area $a_{11}$ of the photographing lens is focused in the pixel $p_{11}$ among the pixels 201 arranged behind the microlens. In a manner similar to that mentioned above, a ray of light which exits from the pupil division area $a_{11}$ and passes through another microlens is also focused in the pixel $p_{11}$ among the pixels 201 arranged behind the microlens.

Figure 5A:
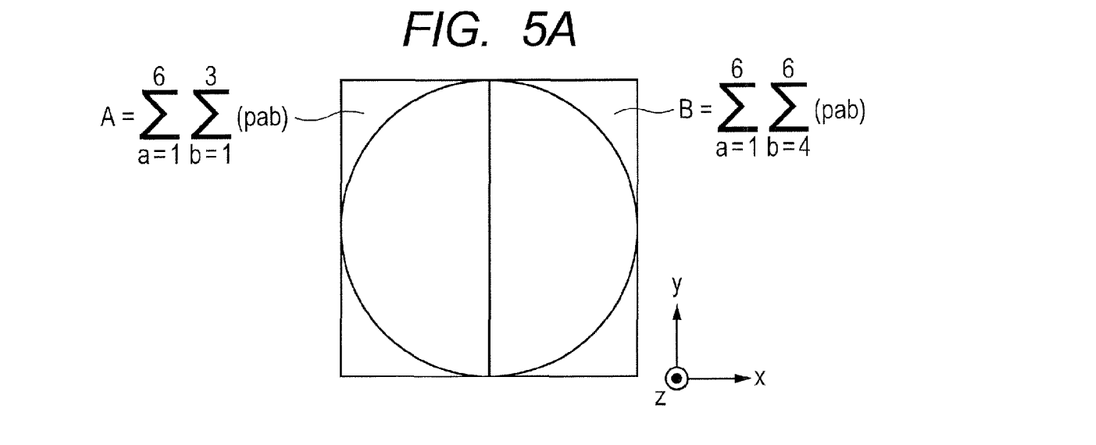
FIGS. 5A and 5B are diagrams for describing a generation of a signal which is used in a correlation arithmetic operation in an AF and an object tracking in the imaging apparatus according to the embodiment of the invention.

Since the pixels $p_{11}$ to $p_{66}$ illustrated in FIG. 4B receive the rays of light which pass through the different pupil areas for the photographing lens as mentioned above, if those information is used, a focus state of the optical image of the object is detected and the focus adjustment can be also made. As illustrated in FIG. 5A, the pixel outputs $p_{11}$ to $p_{66}$ corresponding to each microlens are added and two signals of the pupil areas divided in the horizontal direction are generated as shown by the following equations (1) and (2).

$$A = \sum_{a=1}^{6} \sum_{b=1}^{3} (P_{ab}) \tag{1}$$

$$B = \sum_{a=1}^{6} \sum_{b=4}^{6} (P_{ab}) \tag{2}$$

Figure 5B:
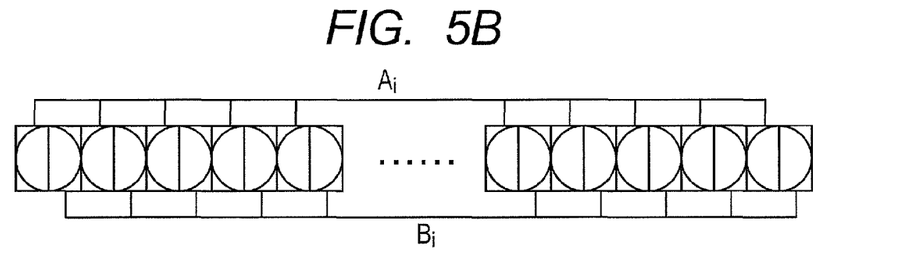

Pupil areas of the photographing lens which are measured by a combined signal A calculated by the equation (1) are the areas $a_1$ to $a_3$ of an exit pupil of the photographing lens illustrated in FIG. 3. Pixels whose signals are added by the equation (1) receive the rays of light which pass through those pixels. As illustrated in FIG. 5B, a one-dimensional image signal $A_i$ (i=1, 2, 3, . . . , n) is generated by arranging $A_1$ to $A_n$ obtained from a pixel group corresponding to the n microlenses arranged continuously in the horizontal direction. In a case where a one-dimensional image signal $B_i$ (i=1, 2, 3, . . . , n) is similarly generated by arranging a combined signal B calculated by the equation (2), $A_i$ and $B_i$ are signals respectively viewing right and left sides of the exit pupil of the photographing lens. Therefore, by detecting a relative position (focus states) of $A_i$ and $B_i$ and multiplying a relative shift amount by a predetermined conversion coefficient, the focus detecting operation based on a phase difference detection method can be executed. If $A_i$ and $B_i$ are generated at an arbitrary position in a picture image, a focus position (driving position of the focus lens) at this position can be calculated. Therefore, the auto focus adjustment is made by driving the focus lens in accordance with a calculation result.

Subsequently, such processings that the digital image data obtained by using the imaging optical system constructed by the photographing lens 101, MLA 102, and imaging element 103 is reconstructed to an image at a focus position (refocus plane) which is arbitrarily set will be described. The reconstruction is performed in the image processing unit 105 by using a method called "Light Field Photography".

Figure 6:
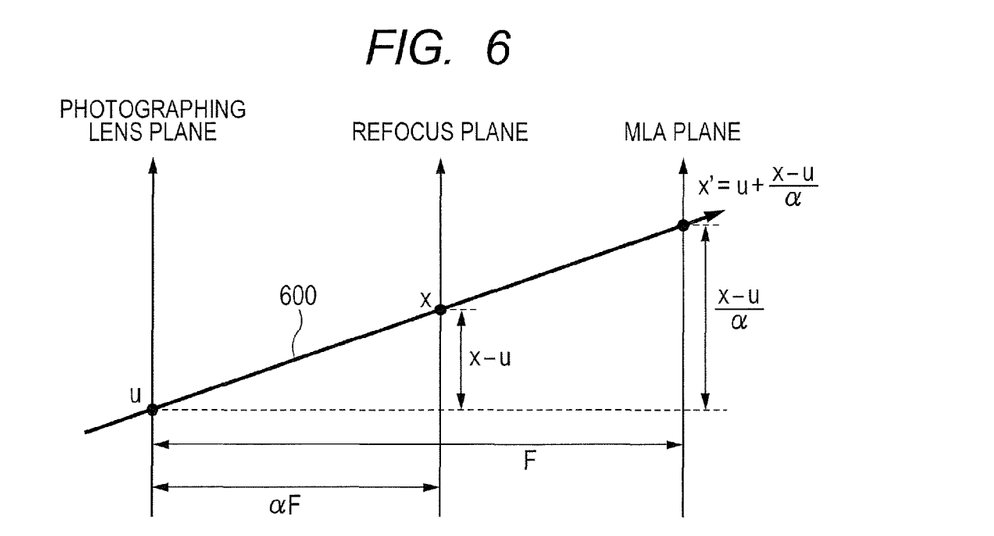
FIG. 6 is a diagram for describing a generation of a refocus image.

FIG. 6 is a diagram illustrating how the ray of light passing through the pixel existing on the refocus plane which is arbitrarily set exits from one of the pupil division areas of the photographing lens and enters one of the microlenses, when viewing from the direction perpendicular to the optical axis (z axis). As illustrated in the diagram, it is assumed that coordinates of the position of the pupil division area of the photographing lens are (u, v), coordinates of the position of the pixel on the refocus plane are (x, y), and coordinates of the position of the microlens on the microlens array are (x', y'), respectively. It is also assumed that a distance from the photographing lens to the microlens array is F and a distance from the photographing lens to the refocus plane is αF. α denotes a refocus coefficient to decide the position of the refocus plane and can be arbitrarily set by the user. In FIG. 6, only directions of u, x, and x' are shown and directions of v, y, and y' are omitted.

As illustrated in FIG. 6, a ray of light 600 which passes through the coordinates (u, v) and the coordinates (x, y) reach the coordinates (x', y') on the microlens array. The coordinates (x', y') can be expressed as shown by the following equation (3).

$$(x', y') = \left(u + \frac{x-u}{\alpha}, v + \frac{y-v}{\alpha}\right) \quad (3)$$

Assuming that an output of the pixel which receives the light 600 is L(x', y', u, v), an output E(x, y) which is obtained at the coordinates (x, y) on the refocus plane is an output obtained by integrating the output L(x', y', u, v) with respect to the pupil area of the photographing lens. Therefore, the output E(x, y) is expressed as shown by the following equation (4).

$$E(x, y) = \frac{1}{\alpha^2 F^2} \int\int L\left(u + \frac{x-u}{\alpha}, v + \frac{y-v}{\alpha}, u, v\right) du dv \quad (4)$$

In the equation (4), since the refocus coefficient α is decided by the user, if (x, y) and (u, v) are provided, the position (x', y') of the microlens into which the light 600 enters can be known. The pixel corresponding to the position of (u, v) can be known from a plurality of pixels corresponding to the microlens and an output of this pixel is L(x', y', u, v). By executing the above processing to all of the pupil division areas and summing (integrating) obtained pixel outputs, E(x, y) can be calculated.

Assuming that (u, v) denotes representative coordinates of the pupil division areas of the photographing lens, the integration of the equation (4) can be calculated by a simple addition.

By executing the arithmetic operation processing of the equation (4) as mentioned above, the image at the arbitrary focus position (refocus plane) can be reconstructed.

Figure 7:
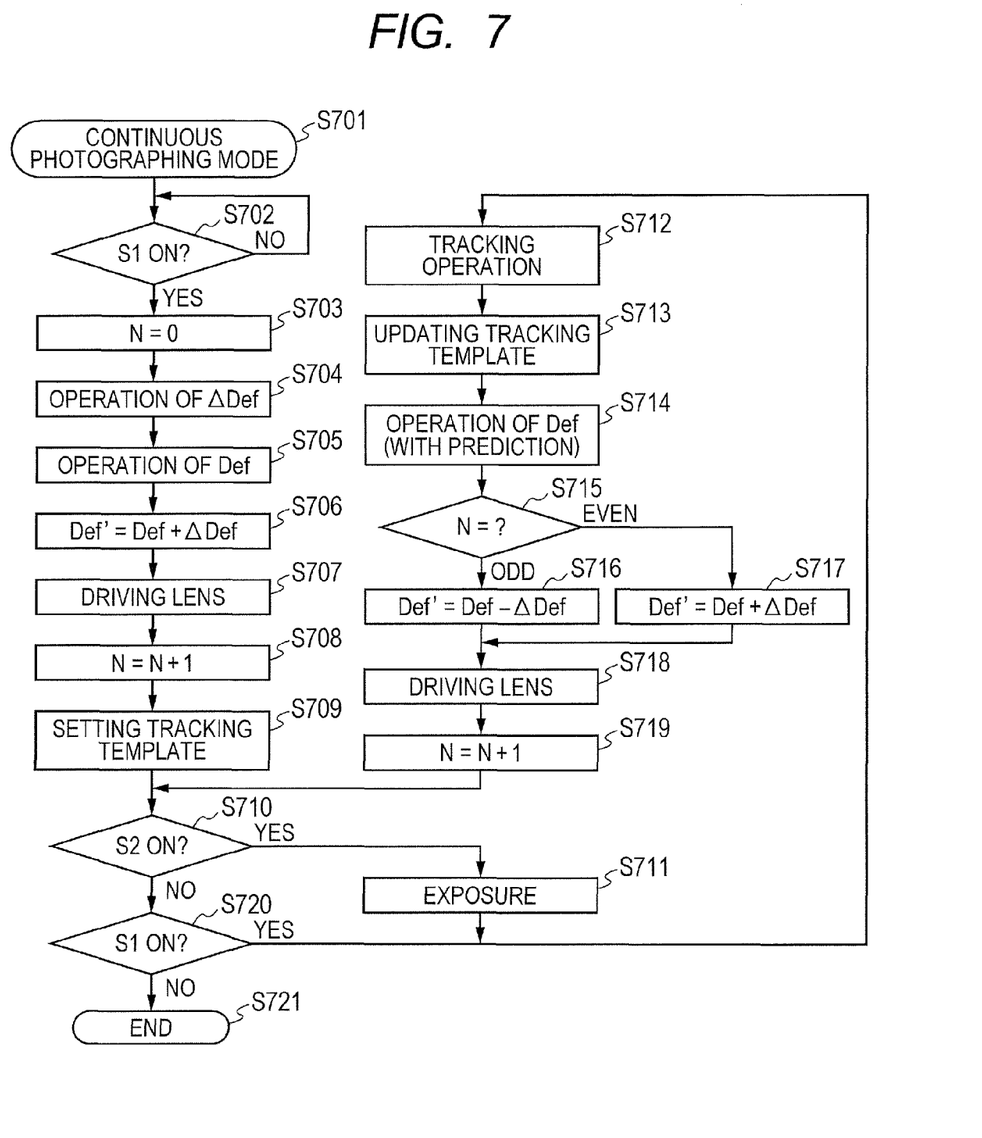
FIG. 7 is a diagram illustrating a flowchart for the operation of the imaging apparatus according to the embodiment of the invention.

Subsequently, a continuous photographing operation (continuous photographing mode) of the imaging apparatus according to the embodiment will be described with reference to a flowchart of FIG. 7. As a prerequisite, the operation in a live view mode in which the image signals of the object obtained by the imaging element 103 are reconstructed and displayed to the display unit 107 in a real-time manner.

In S701 and S702, the apparatus waits until S1 is turned on in the continuous photographing mode. S1 denotes a switch (not shown) included in the operation unit 110. By turning on the switch S1, a preparing operation before photographing such as photometry, auto focus, and the like is started. Actually, the switch S1 is a push button switch of a two-step depression type for detecting two steps of a half depression state and a full depression state. It is assumed that the half depression state denotes a state where the switch S1 is ON and the full depression state denotes a state where a switch S2 is ON. Generally, when S1 is ON, the photographing preparing operation is executed, and when S2 is ON, the actual photographing (exposing) operation is executed. Also in the embodiment, the apparatus operates in a manner similar to that mentioned above.

In S703, a counter N to count the number of times of driving of the focus lens is initialized and N=0 is set. Thereby, each of a plurality of continuous frames which are picked up in the continuous photographing operation can be identified.

In the embodiment, at the time of the continuous photographing, the focus lens is moved to a position deviated from the detected focus position by ±ΔDef and the photographing is performed. A sign ± indicates a deviating direction of the driving position of the focus lens. In the embodiment, plus (+) corresponds to the direction of the infinite side of the driving direction of the lens and minus (−) corresponds to the direction of the near side. In S704, an amount of ΔDef is calculated. ΔDef will be described with reference to FIG. 8.

Figure 8:
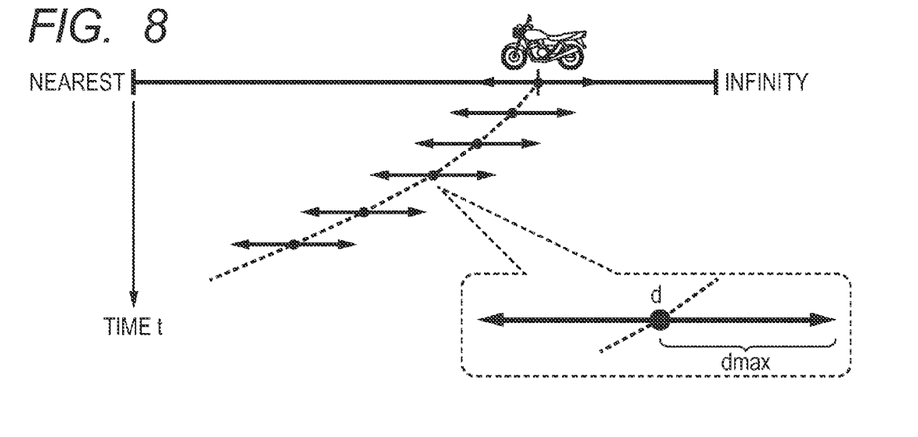
FIG. 8 is a diagram illustrating a position of a focus lens and a refocus range at the time of a continuous photographing in which the invention is not executed.
Figure 9:
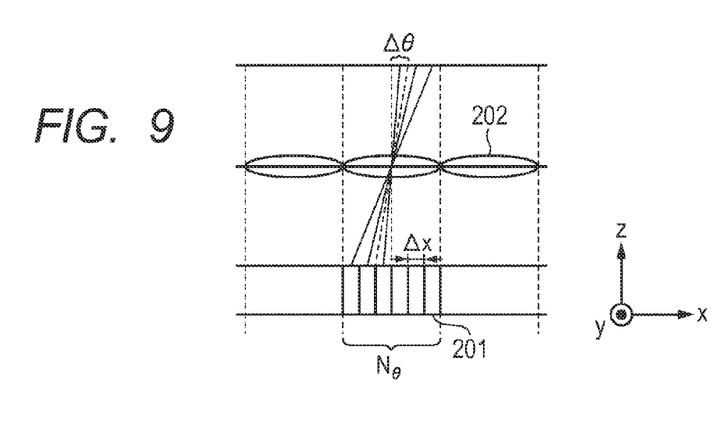
FIG. 9 is a diagram for describing a maximum refocus amount of the imaging apparatus according to the embodiment of the invention.

FIG. 8 is a diagram illustrating a change in focus position in the case where a predetermined object (in this instance, an example of a motorcycle) which approaches the photographer side is continuously photographed while detecting a focal point. An axis of abscissa denotes a position of the focus lens, an axis of ordinate indicates an elapsed time, and a width of each arrow indicates a refocus range. It is now assumed that the object which approaches as shown by a broken line could be photographed while ideally measuring a distance. In this case, as for each photographed image, the image which is in-focused to the motorcycle can be reconstructed and, even in the case where an in-focus accuracy is low due to some reasons, the focus position can be adjusted so long as it lies within the refocus range. As for the range where the image can be refocused, when an angle resolution Δθ, the number $N_θ$ of divided angles, and a pixel pitch Δx are defined as illustrated in FIG. 9, a maximum refocus amount $d_{mac}$ is calculated by the following equation (5).

$$d_{max} = \frac{N_θ \cdot \geq x}{\tan(\geq θ)} \quad (5)$$

As mentioned above, the refocus range is generally finite although it depends on the construction of the imaging apparatus. Even in the case of FIG. 8, it is difficult to realize such a construction that the whole area from the nearest side to the infinite side of the driving range of the focus lens lies within the refocus range. Therefore, for example, even in the case where the user wants to reconstruct an image which is in-focused to the second object like another motorcycle which runs behind the motorcycle as a target object, since the refocus range is limited, there is a possibility that a reconstructed image cannot be obtained.

Figure 10:
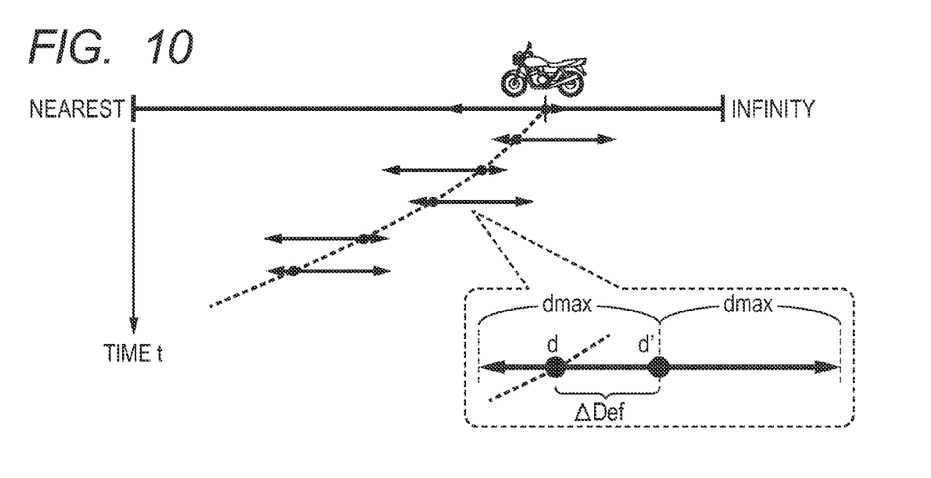
FIG. 10 is a diagram for describing the position of the focus lens and the refocus range according to the embodiment of the invention.

In the embodiment, therefore, the refocus range is falsely magnified by alternately obtaining the images at the focus positions which are deviated from an inherent focus detection position Def by ±ΔDef (predetermined amount). Specifically speaking, a defocus amount is controlled in such a manner that a predetermined object alternately comes to an edge on the nearest side and to an edge on the infinite side of the refocus range every other frame. Such an example is illustrated in FIG. 10. In the example of FIG. 10, as for the odd-number designated frames, the refocus range is divided into areas at a reference point which is the focus point of the target object so that an area on the nearest side is larger than that on the other side, and on the contrary, as for the even-number designated frames, the refocus range is divided into areas at the reference point which is the focus point of the target object so that an area on the infinite side is larger than that on the other side, thereby enabling the refocus range to be falsely widened. At this time, as for the frames whose refocus range is widened to the nearest side or the infinite side, although a continuous photographing speed is reduced to the half speed of that of the original photographed image. However, in all of the frames, the target object can be made to lie within the refocus range. Although the defocus amount is alternately controlled in the embodiment, the invention is not limited to such an example but the defocus amount may be switched every predetermined frames, or the defocus amount may be distributed only for one frame after n frames of the image of the refocus range in which the number of objects to be covered is large, or the like.

Consequently, for example, if $$ΔDef = 0.8 \cdot d_{max} \quad (6)$$

is set, the refocus range can be enlarged to a range which is 1.8 times as large as that in the normal case illustrated in FIG. 8 centering around the focus position of the target object. Thus, the refocus image which is refocused to the object existing in a wider range than that in the case of FIG. 8 can be obtained.

If ΔDef is determined, S705 follows. S705 to S709 relate to the operation for holding a target of object tracking as a template first in order to track the target object. The object tracking will now be described with reference to FIG. 11.

Figure 11:
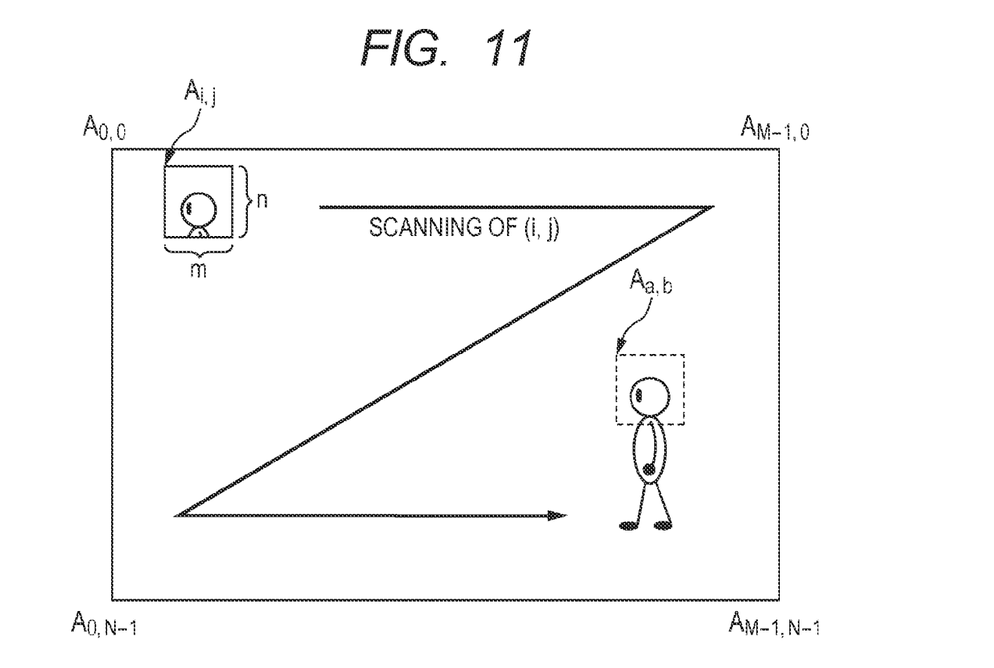
FIG. 11 is a diagram for describing an arithmetic operation of the object tracking according to the embodiment of the invention.

An arithmetic operation for object tracking is executed by using a template image (image signal of the target of object tracking) stored in a camera main body and an image signal obtained after the elapse of a predetermined time from the obtainment of the template image and by using a two-dimensional correlation arithmetic operation of both of those images. It is now assumed that both images provide the image signals having chrominance information of R, G, and B. First, both images are converted into luminance information Y. It is assumed that the template image for object tracking has a size of m pixels (in the horizontal direction)×n pixels (in the vertical direction) and the image signal (target image of template detection) obtained after the elapse of the predetermined time from the obtainment of the template image has a size of M pixels (in the horizontal direction) ×N pixels (in the vertical direction). In the arithmetic operation for object tracking, while shifting the relative position between both images, a correlation amount S as a sum of absolute differences of Y between both images at respective positions is calculated. If the template image for object tracking and the target image of template detection exist at a completely coincident position, the correlation amount S is equal to 0. Therefore, the arithmetic operation for object tracking is such an operation that while shifting the relative position between both images, a value of the correlation amount S is calculated at each position and a position where the correlation amount S becomes minimum is searched for. The target image of template detection is expressed by $A_{i,j}$ (0≤i≤(M−1), 0≤j≤(N−1)) and the template image for object tracking is expressed by $B_{x,y}$ (0≤x≤(m−1), 0≤y≤(n−1)). The correlation amount S at the time when both images exist at a certain relative position I(i, j) is obtained by the following equation (7).

$$S = \sum_{y=0}^{n-1} \sum_{x=0}^{m-1} |A_{i+x, j+y} - B_{x,y}| \quad (7)$$

Therefore, while changing the relative position I(i, j) and scanning the inside of the target image of template detection $A_{i,j}$, the position I(i, j) where the correlation amount S becomes minimum is considered as a position where the target of object tracking exists. In the example of FIG. 11, the correlation amount S becomes minimum at the position of I(i, j)=(a, b) (position shown by a broken line). Further, after the arithmetic operation for object tracking is finished, the template image for object tracking is updated to an image at a position where the correlation is highest in the present arithmetic operation. By successively updating the template image for object tracking as mentioned above, an influence on the arithmetic operation for object tracking caused by a change in direction or the like of the target of object tracking can be reduced.

In the embodiment, a setting frame which can be moved to an arbitrary position in the picture image by the user is displayed so as to be overlaid to the real-time image signal of the object displayed to the display unit 107 so that the template image for object tracking to be set can be decided by the user. The user moves the setting frame to a position where he wants to start the object tracking, and turns on S1 at timing when the setting frame is overlaid to the target object. That is, the image signal in the setting frame at a point of time when S1 is turned on in S702 is fundamentally set as a template. However, in order to prevent the image signal in a defocusing state from being set as a template, a template storage processing is executed after the focusing operation.

For this purpose, the defocus amount Def is calculated in S705. That is, the one-dimensional image signals $A_i$ and $B_i$ as shown in FIGS. 5A and 5B mentioned above are generated from the image signal in the setting frame. Subsequently, a phase difference therebetween is obtained, and the defocus amount Def is calculated on the basis of the phase difference. After Def is calculated, a value of Def is shifted by an amount of $\Delta Def$ which is previously calculated. When N is equal to an even number, the value of Def is shifted to the plus side by the amount of $\Delta Def$.

$$Def'=Def+\Delta Def \quad (8)$$

When N is equal to an odd number, the value of Def is shifted to the minus side by the amount of $\Delta Def$.

$$Def'=Def-\Delta Def \quad (9)$$

However, they may be vice versa. In S706, since N=0, Def' shifted to the plus side is calculated. In S707, the focus lens is driven in accordance with Def'. In S708, the number N of times of driving of the lens is counted up. At this time, if the target object in the target frame is reconstructed at the refocus coefficient $\alpha=1$ as it is, since the image is defocused by the amount of $+\Delta Def$, a reconstructed image which is defocused by this amount is generated and the image in the setting frame is stored as an initial template in S709.

In S710, whether or not S2 is ON is discriminated. When S2 is ON, an exposure processing is executed in S711. The processing routine advances to S712 in order to make preparation for photographing a next image. When S2 is not ON, a state of S1 is confirmed in S720. If S1 is also OFF, the operation is finished in S721. However, if S1 is ON, S712 follows in order to perform the object tracking.

Processings in S712 and subsequent steps are processings which are executed when the number N of times of driving of the lens is equal to 1 or more. First, in S712, a two-dimensional correlation arithmetic operation is executed by using the template of object tracking set in S709 and the image signal of the refocus image reconstructed by refocusing the output of the imaging element 103 at this point of time by $\Delta Def$, and the object tracking arithmetic operation for specifying the position of the object in the picture image is executed. In the embodiment, according to the processings which are executed when the number N is equal to 1 or more, the reconstructed image which is obtained at $\alpha=1$ becomes the image which is defocused by $\pm\Delta Def$. Therefore, with respect to the image signal which is used to obtain correlation to the template image by the object tracking arithmetic operation, a reconstructed image which is refocused so as to cancel the defocused amount $\Delta Def$ is used. With respect to details of the object tracking arithmetic operation, a point that the calculation is performed by using the correlation amount S shown in the equation (7) is already mentioned above. If a new position in the picture image of the target object is specified by the object tracking arithmetic operation, the image in such an area is set to a new template and the setting of the template is updated in S713.

After the setting of the template is updated, in S714, the defocus amount Def at the tracked position in the picture image is obtained. At this time, although Def is obtained in a manner similar to S705, if the tracked object is moving, since a release time lag exists between the timing for the arithmetic operation of Def and the timing for the subsequent exposure, an amount of movement of the object during such a period of time is predicted and Def is corrected. That is, in S714, a defocus amount is calculated in a manner similar to S705 and, further, a moving speed of the target object and the like are calculated on the basis of past results of Def, thereby arithmetically operating Def with a prediction so that the image reconstructed at $\alpha=1$ is formed at the optimum focus position upon releasing. Since the prediction is well-known in Patent Literature 1 and the like, its details are omitted here. After Def is obtained in S714, S715 follows.

In S715, whether or not the number N of times of driving of the lens is equal to an even number or an odd number is discriminated. If it is the odd number, Def' is calculated by the following equation (8) in S716.

$$Def'=Def-\Delta Def \quad (8)$$

If it is the even number, Def' is calculated by the following equation (9) in S717.

$$Def'=Def+\Delta Def \quad (9)$$

After the focus lens is driven in S718 in accordance with Def' obtained in this manner, N is counted up in S719 and S710 follows.

Figure 12:
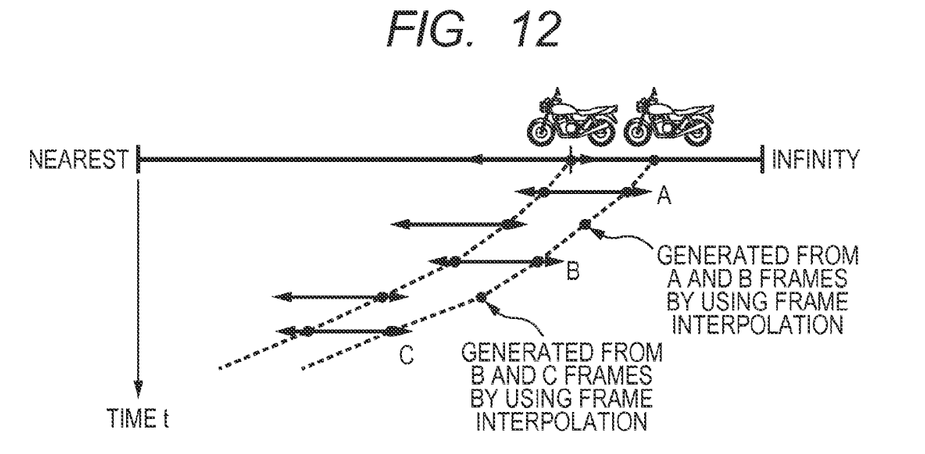
FIG. 12 is a diagram for describing technological effects of the embodiment of the invention.

If the refocus range is shifted every other frame to the infinite side or the nearest side at the time of the continuous photographing as mentioned above, the following technological effects are obtained in, for example, a race scene of motorcycles as illustrated in FIG. 12 or the like. The white motorcycle as a target object in FIG. 12 lies within the refocus range with respect to all frames and a gray motorcycle (object different from the target of object tracking) which runs after the white motorcycle can be also made to lie within the refocus range at a rate of one frame per two frames. At this time, since the number of images which are in-focused to the gray motorcycle is reduced, a frame interpolation technique is performed from two images of A and B in FIG. 12 (both of them are refocus image data which are subjected to the refocus processing and reconstructed so as to be in-focused to the gray motorcycle) and a new image may be generated by a post-processing. According to the frame interpolation technique, motion information is calculated from a difference between two images which are continuous with respect to time and an intermediate image is formed in accordance with a direction and a size of the motion. However, since it is a well-known technique, its description is omitted here.

According to the embodiment of the invention described above, it is possible to provide the imaging apparatus which can perform such a continuous photographing operation that an image which can be refocused to the main object with respect to all of the photographed frames can be assured and a wide refocus range where an image can be also refocused to other objects can be assured.

Figure 13A:
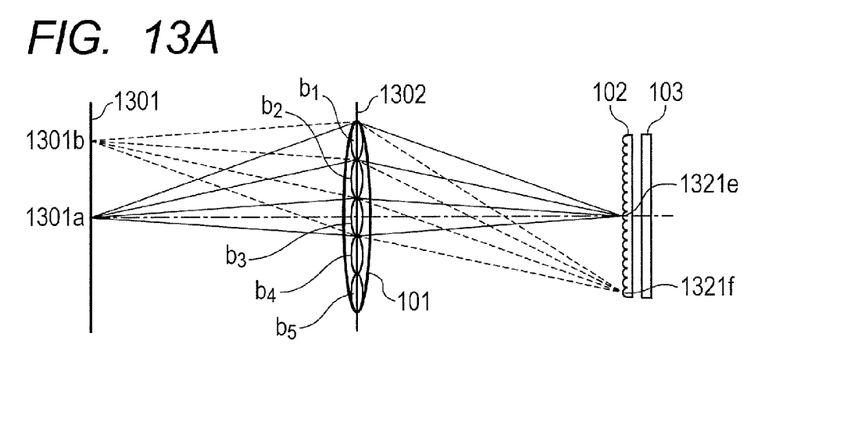
FIGS. 13A, 13B and 13C are diagrams for describing an example of another optical system to which the embodiment of the invention can be applied.
Figure 13B:
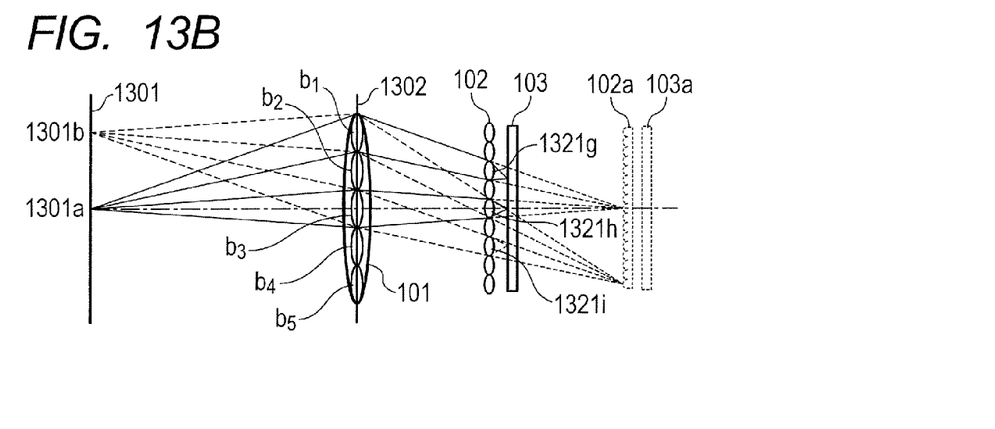
Figure 13C:
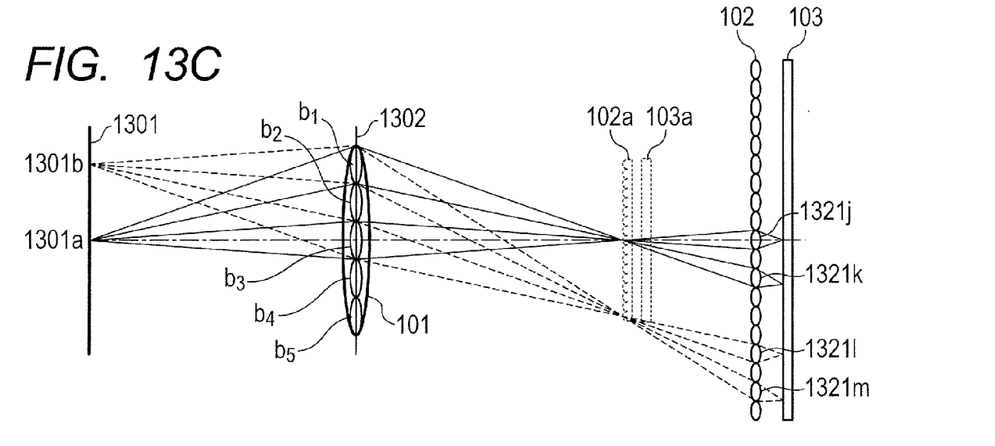

An example of another optical system which can be applied to the embodiment will be described with reference to FIGS. 13A to 13C. FIGS. 13A to 13C are diagrams schematically illustrating a state where light from an object (object to be photographed) is focused onto the imaging element 103. In the diagrams, substantially the same component elements as those in FIGS. 1 and 3 are designated by the same reference numerals.

FIGS. 13A to 13C correspond to the photographing optical system described in FIG. 3. However, in the imaging element 103, the number of pixels allocated to one microlens in the microlens array 102 is equal to 25 (=5×5). The exit pupil of the photographing lens 101 is expressed by five pupil areas (b1, b2, b3, b4, b5) in the vertical direction. FIG.

13A is an example in which the microlens array 102 is arranged near the imaging plane of the photographing optical system. FIG. 13B is an example in which the microlens array 102 is arranged on the side closer to the object than the imaging plane of the photographing optical system. FIG. 13C is an example in which the microlens array 102 is arranged on the side farther from the object than the imaging plane of the photographing optical system.

In FIGS. 13A to 13C, the imaging element 103, the microlens array 102, the pupil areas b1, b2, b3, b4, and b5, an object plane 1301, proper points 1301a and 1301b on the object, and a pupil plane 1302 of the photographing optical system are illustrated. Specific microlenses 1321e, 1321f, 1321g, 1321h, 1321i, 1321j, 1321k, 1321l, and 1321m on the microlens array 102 are illustrated, respectively. A virtual imaging element 103a and a virtual MLA 102a are illustrated in FIGS. 13B and 13C and they are illustrated as a reference in order to clarify a correspondence relation with FIG. 13A. Rays of light which exit from the point 1301a on the object and pass through the areas b1 and b3 on the pupil plane are shown by solid lines. Rays of light which exit from the point 1301b on the object and pass through the areas b1 and b3 on the pupil plane are shown by broken lines.

In the example of FIG. 13A, by arranging the microlens array 102 near the imaging plane of the photographing optical system, there is a conjugate relation between the imaging element 103 and the pupil plane 1302 of the photographing optical system. Further, there is a conjugate relation between the object plane 1301 and the microlens array 102. Therefore, the ray of light exiting from the point 1301a on the object reaches the microlens 1321e, the ray of light exiting from the point 1301b on the object reaches the microlens 1321f, and the rays of light which passed through the areas b1 to b5 reach the corresponding pixels provided under the microlenses, respectively.

In the example of FIG. 13B, the light from the photographing optical system is focused by the microlens array 102 and the imaging element 103 is provided on the imaging plane. By arranging them as mentioned above, there is a conjugate relation between the object plane 1301 and the imaging element 103. The ray of light exiting from the point 1301a on the object and passing through the area b1 on the pupil plane reaches the microlens 1321g. The ray of light exiting from the point 1301a on the object and passing through the area b3 on the pupil plane reaches the microlens 1321h. The ray of light exiting from the point 1301b on the object and passing through the area b1 on the pupil plane reaches the microlens 1321h. The ray of light exiting from the point 1301b on the object and passing through the area b3 on the pupil plane reaches the microlens 1321i. The ray of light which passes through each microlens reaches the corresponding pixel provided under the microlens. As mentioned above, the light is focused to different positions depending on the points on the object and the passing areas on the pupil plane. If those rays of light are rearranged to the positions on the virtual imaging element 103a, information (reconstructed image) similar to that in FIG. 13A can be obtained. That is, information of the pupil area (incidence angle) through which the light passes and the position on the imaging element can be obtained.

In the example of FIG. 13C, the light from the photographing optical system is refocused (since the light in a state where the light which is focused once is diffused is focused, it is called "refocused") by the microlens array 102 and the imaging element 103 is provided on the imaging plane. By arranging them as mentioned above, there is a conjugate relation between the object plane 1301 and the imaging element 103. The ray of light exiting from the point 1301a on the object and passing through the area b1 on the pupil plane reaches the microlens 13211. The ray of light exiting from the point 1301a on the object and passing through the area b3 on the pupil plane reaches the microlens 1321j. The ray of light exiting from the point 1301b on the object and passing through the area b1 on the pupil plane reaches the microlens 1321m. The ray of light exiting from the point 1301b on the object and passing through the area b3 on the pupil plane reaches the microlens 1321l. The ray of light which passes through each microlens reaches the corresponding pixel provided under the microlens. In a manner similar to FIG. 13B, if those rays of light are rearranged to the positions on the virtual imaging element 103a, information similar to that in FIG. 13A can be obtained. That is, information of the pupil area (incidence angle) through which the light passes and the position on the imaging element can be obtained.

Although an example in which the position information and the angle information can be obtained by using the MLA (phase modulation element) as a pupil division unit is shown in FIGS. 13A to 13C, another optical construction can be also used so long as it can obtain the position information and angle information (which is equivalent to a processing for restricting the passing areas of the pupil). For example, a method whereby a mask (gain modulation element) formed with a proper pattern is inserted into an optical path of the photographing optical system can be also used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-088728, filed on Apr. 19, 2013, which is hereby incorporated by reference herein in its entirety.

What is claimed is:
1. An imaging apparatus comprising:
   an image sensor configured to capture an optical image of an object and output an image including light field data which can be refocused within a refocusable range by image processing;

at least one processor configured to detect a focus state of the object and to determine an in-focus position of a specified object on the basis of a result of the detection;

a driving mechanism configured to drive a focus lens; and a controller configured to control the driving mechanism to drive the focus lens, wherein, in a case where the image sensor captures a series of images at a plurality of positions of the focus lens, the controller controls the driving mechanism to drive the focus lens to the plurality of positions during the capturing of the series of images so that (1) the determined in-focus position of the specified object falls within the refocusable range of a respective image of the series of images and is a position which is apart from the in-focus position of the focus lens by an amount predetermined by the controller, and (2) a total refocusable range of a predetermined number of images of the series of images is wider than a refocusable range of one of the series of images by a range based on the predetermined amount.

2. The imaging apparatus according to claim 1, wherein the plurality of positions includes a first position in which the in-focus position is on a nearest side of the refocusable range of one of the series of images corresponding to the first position and a second position in which the in-focus position is on an infinite side of the refocusable range of another of the series of images corresponding to the second position.

3. The imaging apparatus according to claim 1, wherein the controller periodically controls the driving mechanism to drive the focus lens to the plurality of positions in a case where the image sensor outputs the plurality of images.

4. The imaging apparatus according to claim 3, wherein the controller controls the driving mechanism to drive the focus lens to the plurality of positions for every frame of the light field data generated by the image sensor.

5. The imaging apparatus according to claim 1, wherein the at least one processor is configured to set a target object and determine its in-focus position, wherein the at least one processor detects the set object from an image corresponding to the light field data and updates the setting of the object in accordance with a result of the detection, and wherein the at least one processor detects a focus state of the object whose setting is updated.

6. The imaging apparatus according to claim 1, wherein the at least one processor includes an image processor configured to reconstruct image data at an image plane position from the light field data, and wherein the at least one processor detects the set object from the image data at the image plane position.

7. The imaging apparatus according to claim 6, wherein the image processor reconstructs image data at an image plane position corresponding to an in-focus position of an object different from the specified object of the determination of the in-focus position by the at least one processor, from image data of each frame of a same pattern among a plurality of patterns among the image pickup data of a plurality of frames generated by the image sensor, and generates an image of a new frame by interpolating a plurality of reconstructed image data.

8. The imaging apparatus according to claim 1, wherein the in-focus position which is determined by the at least one processor is an object distance.

9. A control method of an imaging apparatus including an image sensor configured to capture an optical image of an object and output an image including light field data which can be refocused within a refocusable range by image processing, the control method comprising:

detecting a focus state of the object;

determining an in-focus position of a specified object on the basis of a result of the detection in the detecting; and driving a focus lens, wherein, in a case where the image sensor captures a series of images at a plurality of positions of the focus lens, the focus lens is driven to the plurality of positions during the capturing of the series of images so that (1) the determined in-focus position of the specified object falls within the refocusable range of a respective image of the series of images and is a position which is apart from the in-focus position of the focus lens by a predetermined amount, and (2) a total refocusable range of a predetermined number of images of the series of images is wider than a refocusable range of one of the series of images by a range based on the predetermined amount.

10. A non-transitory computer-readable storage medium storing a program for causing a computer to execute a control method of an imaging apparatus including an image sensor configured to capture an optical image of an object and output an image including light field data which can be refocused within a refocusable range by image processing, the control method comprising:

detecting a focus state of the object;

determining an in-focus position of a specified object on the basis of a result of the detection in the detecting; and driving a focus lens, wherein, in a case where the image sensor captures a series of images at a plurality of positions of the focus lens, the focus lens is driven to the plurality of positions so that (1) the determined in-focus position of the specified object falls within the refocusable range of a respective image of the series of images and is a position which is apart from the in-focus position of the focus lens by a predetermined amount, and (2) a total refocusable range of a predetermined number of images of the series of images is wider than a refocusable range of one of the series of images by a range based on the predetermined amount.

11. The imaging apparatus according to claim 1, wherein the imaging apparatus has a live view mode for displaying reconstructed image data on a display, and wherein the at least one processor displays a setting frame, for setting a target object whose in-focus position is to be determined, on the display so as to be overlaid on the image data.

12. An imaging apparatus comprising:

an image sensor including a microlens array and a plurality of pixels being assigned to one microlens of the microlens array, the image sensor configured to capture an optical image through an image pickup optical system including a focus lens and output an image including image data which can be refocused within a refocusable range;

at least one processor configured to detect a focus state of the object and to determine an in-focus position of a specified object on the basis of a result of the detection;

a driving mechanism configured to drive a focus lens; and a controller configured to control the driving mechanism to drive the focus lens, wherein, in a case where the image sensor captures a series of images at a plurality of positions of the focus lens, the controller controls the driving mechanism to drive the focus lens to the plurality of positions during the capturing of the series of images so that (1) the determined in-focus position of the specified object falls within the refocusable range of a respective image of the series of images and is a position which is apart from the in-focus position of the focus lens by an amount predetermined by the controller, and (2) a total refocusable range of a predetermined number of images of the series of images is wider than a refocusable range of one of the series of images by a range based on the predetermined amount.

13. A control method of an imaging apparatus including an image sensor having a microlens array and a plurality of pixels being assigned to one microlens of the microlens array, the image sensor configured to capture an optical image through an image pickup optical system including a focus lens and output an image including image data which can be refocused within a refocusable range, the control method comprising:

detecting a focus state of the object;
determining an in-focus position of a specified object on the basis of a result of the detection in the detecting; and
driving a focus lens,
wherein, in a case where the image sensor captures a series of images at a plurality of positions of the focus lens, the focus lens is driven to the plurality of positions during the capturing of the series of images so that (1) the determined in-focus position of the specified object falls within the refocusable range of a respective image of the series of images and is a position which is apart from the in-focus position of the focus lens by a predetermined amount, and (2) a total refocusable range of a predetermined number of images of the series of images is wider than a refocusable range of one of the series of images by a range based on the predetermined amount.

14. A non-transitory computer-readable storage medium storing a program for causing a computer to execute a control method of an imaging apparatus including an image sensor having a microlens array and a plurality of pixels being assigned to one microlens of the microlens array, the image sensor configured to capture an optical image through an image pickup optical system including a focus lens and output an image including image data which can be refocused within a refocusable range, the control method comprising:

detecting a focus state of the object;
determining an in-focus position of a specified object on the basis of a result of the detection in the detecting; and
driving a focus lens,
wherein, in a case where the image sensor captures a series of images at a plurality of positions of the focus lens, the focus lens is driven to the plurality of positions during the capturing of the series of images so that (1) the determined in-focus position of the specified object falls within the refocusable range of a respective image of the series of images and is a position which is apart from the in-focus position of the focus lens by a predetermined amount, and (2) a total refocusable range of a predetermined number of images of the series of images is wider than a refocusable range of one of the series of images by a range based on the predetermined amount.

* * * * *